United States Patent

[11] 3,620,870

| [72] | Inventor | Michel Antoine Jules Maistre<br>41, rue Gutenberg, Paris, France |
|---|---|---|
| [21] | Appl. No. | 663,059 |
| [22] | Filed | Aug. 24, 1967 |
| [45] | Patented | Nov. 16, 1971 |
| [32] | Priority | Aug. 26, 1966 |
| [33] | | France |
| [31] | | 74,350 |

[54] LIGHTWEIGHT CELLULAR STRUCTURE
11 Claims, 38 Drawing Figs.

[52] U.S. Cl. .................................................. 156/197,
156/285, 161/68, 161/69
[51] Int. Cl. ................................................. B31d 3/00
[50] Field of Search.......................................... 156/77,
197, 285, 210; 161/68, 69

[56] References Cited
UNITED STATES PATENTS

| 1,845,976 | 2/1932 | Betterton ..................... | 156/210 |
| 2,477,852 | 8/1949 | Bacon ......................... | 156/197 X |
| 2,919,472 | 1/1960 | Steele........................... | 156/197 |
| 2,978,006 | 4/1961 | Clemens....................... | 156/210 |
| 3,086,899 | 4/1963 | Smith et al. .................. | 156/210 |
| 3,321,355 | 5/1967 | Holland........................ | 156/197 X |
| 3,373,069 | 3/1968 | Gillespie...................... | 156/292 X |
| 3,466,220 | 9/1969 | Allinikov et al. ............. | 156/197 X |

*Primary Examiner*—Samuel W. Engle
*Attorney*—Holcombe, Wetherill & Brisebois

ABSTRACT: A lightweight structure made from a plurality of sheets crimped to form recesses, the sides and surface of which recesses lie in at least three intersecting sets of parallel planes, said sheets being connected together along the rims of the recesses to form a cellular structure.

LIGHTWEIGHT CELLULAR STRUCTURE

Lightweight structures have heretofore been devised for resisting various forces, for example, compression, traction, flexing and torsion.

Among the known lightweight structures are hollow bricks, corrugated cardboard, and honeycomb structures. In constructions of that type the material is positioned along surfaces having a common direction. For this reason the anisotropy of these structures is greatly accentuated and cannot be selected to suit the particular use which is to be made of them. Moreover, if the walls are relatively thin with respect to the dimensions of the cells, the resistance of these structures to compression and flexing is limited by the possibility that these walls will buckle.

In another type of known lightweight structures, panels are made by assembling crimped components connected together mainly by the flattened corners of the cells. In such structures, if the panels are compressed perpendicularly to their faces, the stresses are not homogenously distributed throughout the structure, so that optimum use of the material is not possible.

If these panels are flexed, which involves compression of one surface and stretching of the opposite surface, the inside of the panel is subjected to a shearing stress which the cell walls do not satisfactorily resist, because they lack continuity, or because they are not properly oriented to resist a particular force.

Another known type of lightweight structure consists of foamed or expanded material. Such structures are practically isotropic, and can be made only from a limited number of materials which have generally mediocre mechanical properties.

Thus the lightweight structures heretofore known generally have the disadvantages which result from an illogical use of the properties of the material, an inherent anisotropy or a limitation on the variety of materials from which they may be made.

It is an object of the present invention to provide a new article of manufacture which consists of a three-dimensional structure essentially characterized by the intersection of at least three sets of planes made of continuous flat material, each set comprising a plurality of parallel equidistant flat surfaces and said sets having no common generatrix.

The embodiments of the structure according to the invention may also have the following characteristics taken singly or in combination:

1. The intersection of two sets of planes define a set of edges and the structure comprises at least three sets of concurrent edges;

2. The space occupied by the structure is divided by said planes into a plurality of polyhedral cells juxtaposed in a uniform manner.

3. In a structure comprising three sets of flat sheets, the orientation and spacing of the sheets in each set are determined by the three pairs of parallel faces of a parallelepiped of any shape, each corner being at the intersection of three edges and the space occupied by the structure being defined by the regular juxtaposition of parallelpipedic cells similar to the said parallelepiped;

4. In a structure comprising four sets of sheets, the direction, the relative position, and the spacing of the sheets in each set are defined by the four faces and the four lateral dimensions of a tetrahedron of any shape, each corner being the point of intersection of six edges and the space occupied by the structure being defined by the regular juxtaposition of three different cells, two symmetrical tetrahedrons opposite each other, and an octahedron;

5. In a structure comprising five sets of flat sheets, the direction, the relative position and the spacing of the sheets in each set are defined by the five faces and the five lateral dimensions of a pyramid whose base is a parallelogram of any shape, each corner being the point of intersection of six edges and the space occupied by the structure being defined by the regular juxtaposition of four different cells: two symmetrical tetrahedrons opposite each other and two pyramids with quadrangular bases which are also symmetrical.

Another object of the present invention is to provide processes for manufacturing the above-cited embodiments of the structure according to the invention.

These processes may be divided into two classes depending on whether the assembly of the constituent parts follows or precedes their formation.

The first class in which assembly follows their formation includes, by way of example:

—a process for assembling components in the form of crimped sheets obtained for example by any appropriate method from sheet material, the cells being tetrahedral in shape;

—The second class, in which the assembly of the components precedes their formation, includes by way of example:

—a process for assembling superimposed sheets of fabric or of simultaneously weaving several sheets of fabric together, the different layers being connected at appropriate points to form links which may be rectangular, square, or rhombic in the direction of the threads or biased with respect to the threads, a subsequent stretching of this assembly being followed by solidification of an impregnating product to form a structure according to the invention;

—a process for assembling layers of material which may be deformed in several directions at once, the connecting set between the various layers being such that a subsequent stretching followed by stiffening forms a structure according to the invention.

In order that the invention may be better understood, several embodiments thereof will now be described, purely by way of illustration, with reference to the accompanying drawings.

Figure 1:
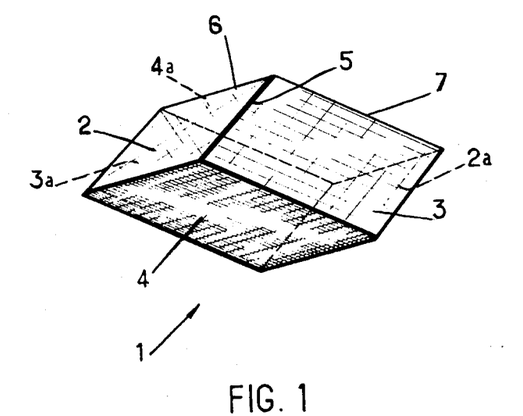
FIG. 1 is a perspective view of a parallelepiped suitable for use in a structure according to the invention.

FIG. 1 shows a parallelepiped 1 having three pairs of parallel sides, 2 and 2a, 3 and 3a, 4 and 4a, extending in three directions, and having all its edges parallel to one of the three edges 5, 6 and 7.

Figure 2:
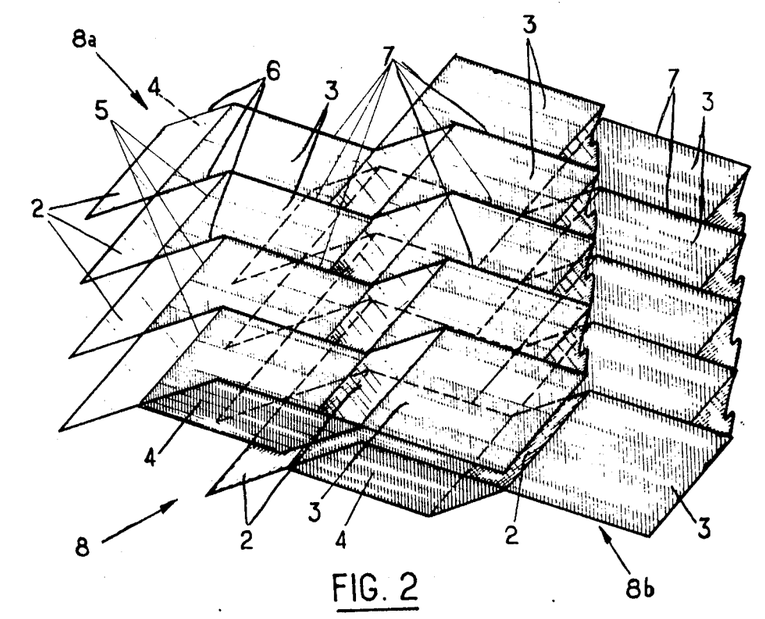
FIG. 2 is a perspective view of an assembly comprising two components made in accordance with the invention, the cells of which are similar to the parallelepiped of FIG. 1.

FIG. 2 shows how two structural elements 8a and 8b are assembled to produce a structure 8 having three sets of planes according to the invention.

Each of these identical elements is in the form of a waffled sheet, the surfaces of which are parallelograms similar to the faces 2, 3 and 4 (or 2a, 3a and 4a, which amounts to the same thing) of the parallelepiped of FIG. 1.

The assembly is so arranged that all the edges which project toward the bottom of the upper element 8a coincide with all the edges which project toward the top of the lower member 8b, as shown in FIG. 2, which shows part of the two members slightly displaced from their actual position. It will be noted that the faces 2, 3 and 4 of the member 8a are in alignment with the corresponding faces of the member 8b and that the two members delimit a series of parallelpipedic cells identical with those of FIG. 1.

It will be appreciated that by repeating the operation with any number of similar members, one beneath the other, it is possible to produce a structure of any desired dimensions in accordance with the embodiment of the invention, having plane surfaces extending in three directions.

In this construction, the faces which are of three different types may be parallelograms, lozenges, rectangles or squares.

Figure 3:
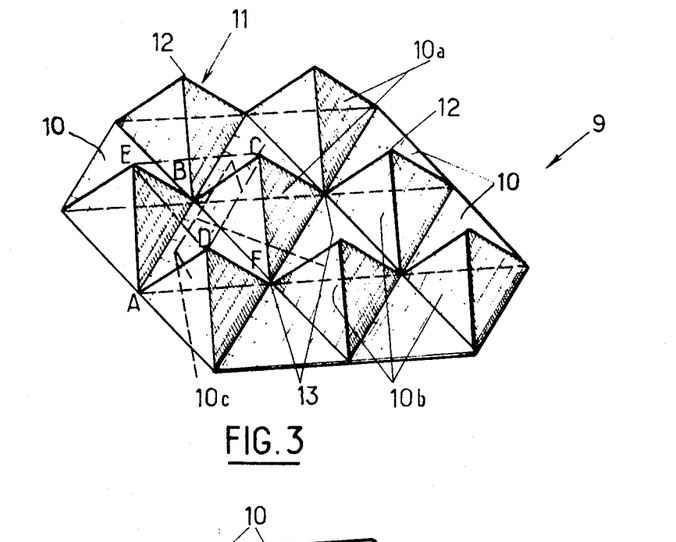
FIG. 3 is a perspective view of a structural element made according to the invention and consisting of cells in the shape of tetrahedrons.

FIG. 3 shows in perspective a structural element 9 in which all the faces are identical equilateral triangles 10.

Reference numerals 10, 10a, 10b and 10c indicate the equilateral triangles. All the triangles 10 lie in the same plane, and are so positioned that they occupy the spaces between the triangular bases of the pyramids formed by the triangles 10a, 10b and 10c, all of said pyramids being positioned on the same side of the plane containing the triangles 10 and being in contact with other triangles at the three apices of their bases.

The series of faces 10a, 10b, 10c are located in planes belonging to three sets of parallel equidistant planes spaced by distances equal to the height of tetrahedron 11. The free corner 12 of the tetrahedrons for each member is located on lines parallel to the sides of triangle 10. The same holds true for corners 13 toward which the edges of three tetrahedrons converge.

Figure 4:
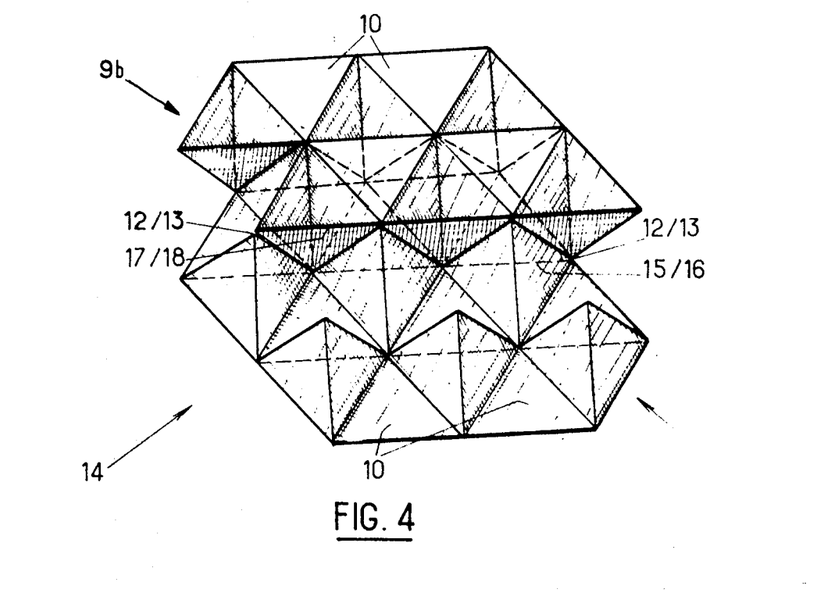
FIG. 4 is a perspective view of an assembly comprising two structural elements analogous to those of FIG. 3.

FIG. 4 shows the assembly of two members 9 similar to that of FIG. 3 to form a structural element 14. Two members 9a and 9b have been brought together with the peaks of their pyramids toward each other. The assembly is so made that the corners 12 of member 9b along line 15 coincide with corners 13 of member 9a along the same line 16 and at the same time the corners 12 of a line 17 next to the aforementioned line 16 of member 9a coincide with corners 13 of line 18 next to line 15 in member 9b. The member 14 thus consists of three sets of parallel planes, formed from continuous sheets of material and located between the two parallel planes containing triangles 10 of members 9a and 9b respectively.

Figure 5:
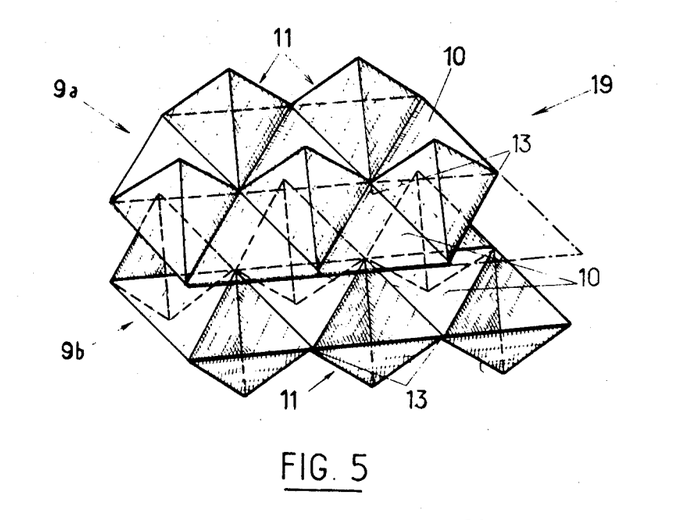
FIG. 5 is a perspective view of another method of assembling the two components of FIG. 3.

FIG. 5 shows another method of assembling the two members 9a and 9b. These two members are so placed that their flat faces consisting of triangles 10 are face to face and the corners 13 of the two members are coinciding, a triangle 10 of a member 9a not coinciding with a triangle 10 of member 9b but being positioned between three triangles of this member 9b inside the structure.

It goes without saying that the two members 9a and 9b according to FIG. 5 constitute a novel structural element 19 according to the invention on which members 9 according to the embodiment shown in FIG. 4 may be mounted.

To provide a large supporting surface for structural elements 9 of the different above-described groups, it may be worthwhile to reduce the extent to which the edges project and replace them along their entire length with a narrow flat surface. A better transmission of forces from one member to another is thus obtained, as well as a better positioning of the members with respect to each other.

Figure 6:
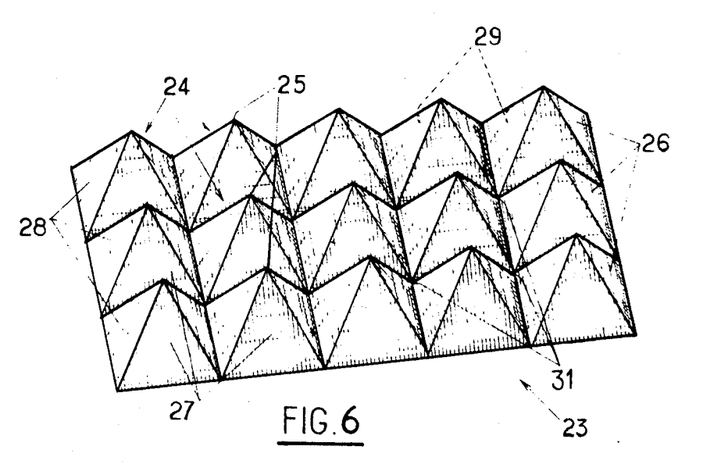
FIG. 6 is a perspective view of a structural element according to the invention consisting of cells in the shape of connected pyramids.

The member 23 of FIG. 6 results from a juxtaposition of pyramids having parallelograms for bases which may take any shape but which have been shown in the drawings as regular pyramids with square bases. These pyramids 24 have no material bases, but the edges which would surround these bases lie in a single plane and intersect each other at points 31 each of which is common to four pyramids.

It is noted that the corners 25 of these pyramids 24 are aligned in two directions and that their faces 26, 27, 28 and 29 are located in four sets of parallel planes which are equidistant from each other and whose width corresponds to the distance from one side of the base to the opposite face.

Figure 7:
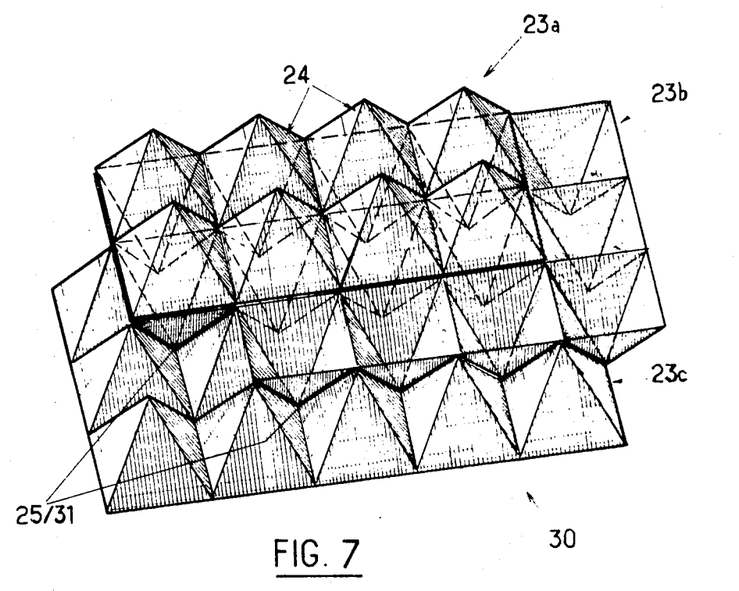
FIG. 7 is a perspective view of a structure according to the invention consisting of an assembly comprising three components analogous to that of FIG. 6.

FIG. 7 shows a composite structure 30 according to the invention. A member 23a has been associated with a member 23b identical to but face to face with the member 23a so that the edges of the bases coincide and the corners 25 of these two members are located on either side of the common plane containing the edges of the bases. The member 23b is fitted into member 23c. The corners 25 of member 23b coincide with the corners 31 of member 23c and the same holds true for corners 31 of member 23b and corners 25 of member 23c. As to the assembly of members 23a, 23b, 23c as has been described, it may be noted that this structure is the same as that obtained by the assembly of member 9 of FIG. 3 forming octahedral cells and twice as many tetrahedrons.

If, in the embodiment of FIG. 7, continuous flat sheets are interposed between the members 23, which are positioned back to back like 23a and 23b, a structure having five sets of planes will be formed.

The previously described embodiments of the structure according to the invention may be manufactured by several processes which will now be described:

Waffled members may be formed by any known method, notably for example, by forming, stamping, molding and assembling.

The members of the structure may also be formed from sheets or any sort of grids of woven material, either organic or mineral, natural or synthetic. The process consists of waffling the woven material according to a process such that none of the threads are stretched or submitted to potentially damaging stresses. The stitches formed by the intersection of threads are changed from squares to rhombuses and the sheets are simultaneously partially folded at certain points.

Figure 8:
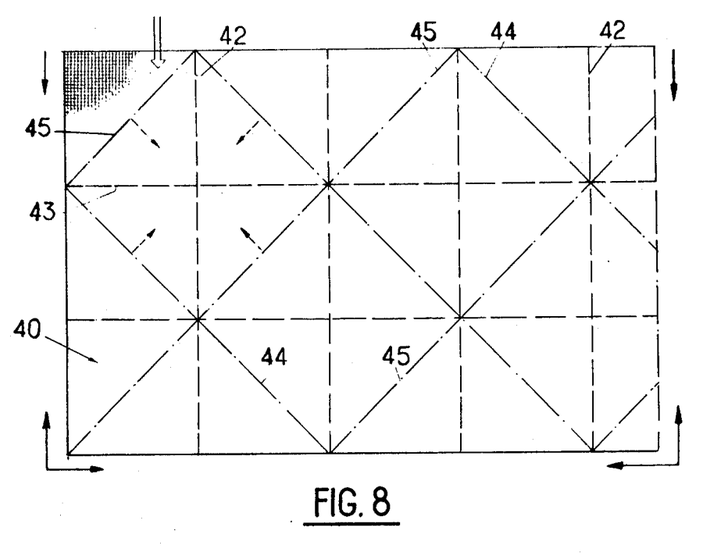
FIG. 8 is a schematic view showing the lines along which a sheet is folded.

FIG. 8 shows the lines governing the deformation of a sheet 40. These lines are regularly spaced and comprise the longitudinal lines 42 parallel to the warp threads and transverse lines parallel to the woof threads, shown by dashes on FIG. 8, the directions 44 and 45 shown by dotted lines on FIG. 8 corresponding to the diagonals of the square stitches formed by lines 42 and 43. To produce the structure the sheet 40 is folded so that the folds along lines 42 and 43 have their edges projecting toward the bottom and the folds along lines 44 and 45 have their edges projecting upwardly.

Figure 9:
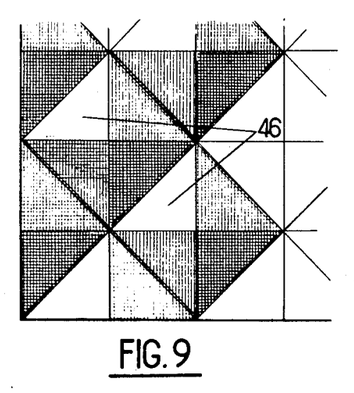
FIG. 9 is a plan view of the sheet after folding along the lines of FIG. 8.

By compressing the sheet 40 in the direction of the arrows in FIG. 8, the sheet is contracted in all directions and takes the shape of juxtaposed diamonds, as shown in FIG. 9, the pyramids 46 having an ideal shape when their faces are equilateral triangles, but these faces may take the form of isosceles triangles.

During this folding process, none of the threads is changed in length. The lateral faces of the pyramids correspond initially to right isosceles triangles. After folding, they correspond to isosceles triangles whose apex angles are less than 90°.

During the above-described process, the sheet must be permitted to contract especially in the proportion 1/ 2 in the case of pyramids whose faces are equilateral triangles. This is why a simple passage between the rollers or plates of a press may not be used, since the threads would be subjected to traction stresses which might damage them.

Two steps may be employed: first an approximate waffling, then a precise shaping with a press or calender.

Figure 10:
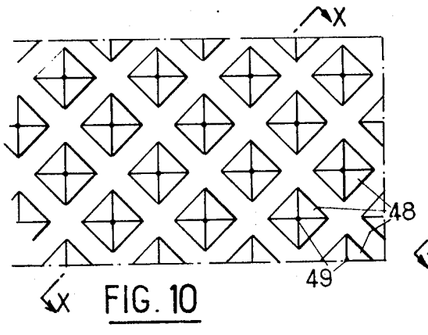
FIG. 10 is a plan view of a set of bars for deforming a sheet.

The first process utilizes a bundle of bars carrying at their ends a pyramid 48 having the desired shape and a sharp point at its apex 49. The bars are separated by a distance equal to 2 times the base of the pyramid. They are staggered with respect to the direction of the sheet as shown in FIG. 10, which shows a view from above the bars. These bars are interconnected by an articulated triangulated system 50 such as that shown in FIG. 11.

Figure 11:
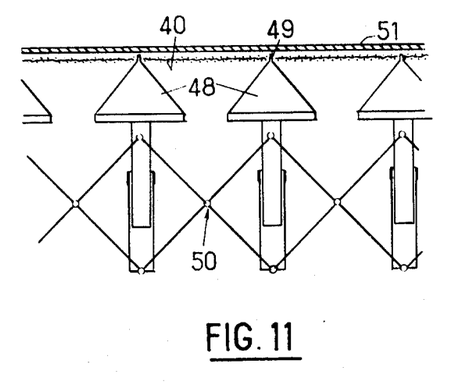
FIG. 11 is a cross-sectional view along the line X—X of FIG. 10 with a superimposed plate.
Figure 12:
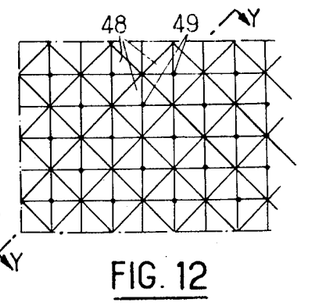
FIG. 12 is a plan view similar to that of FIG. 10, the pyramids of the bars being shown touching.
Figure 13:
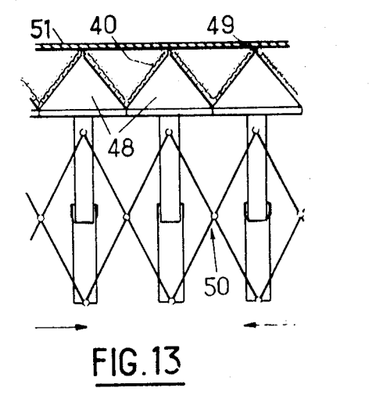
FIG. 13 is a cross-sectional view along the line Y—Y of FIG. 12 with a superimposed plate.

The bars being in the position of FIGS. 10 and 11, the sheet 40, normally stretched so that the warp and woof threads are parallel to the edges of the pyramids as seen from above, is placed on the points. These points 49 run across the sheet and hold it in position. A flat plate 51, whose function is described below, is placed above the sheet and rests on the points 49. By acting on the triangular system 50, the bases of pyramids 48 are brought together as shown in FIG. 12 and 13. The sheet 40 takes approximately the position of FIG. 13, that is, it covers the faces of pyramids 48. The plate 51 keeps the sheet from being forced to a level above the points and forces it instead in the opposite direction.

Figure 14:
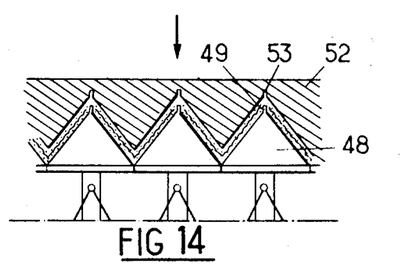
FIG. 14 is a cross-sectional view similar to that of FIG. 13 with a die instead of the plate.

The shape of this structural element must then be perfected by placing the die 52 over the points as shown in FIG. 14, this die having a shape complementary to that of the pyramids of FIG. 12 and having holes 53 through which the points 49 of pyramids 48 can pass.

FIG. 14 is a cross-sectional view similar to that of FIG. 13, a die having replaced the plate.

If necessary, the structure may next or simultaneously be stiffened by any appropriate method, for example by impregnating the sheet, before application of the die, with a product which sets more or less rapidly, especially a synthetic thermosetting resin. In this case, the shaping system is heated. A material which hardens while cold after a short period, such as plaster or cement, may also be used.

The binder joining the threads of the sheet may be made of glass, a thermoplastic material or a metal having a low melting point, which is hardened by cooling, while the sheet is shaped by the application of heat. A sheet shaped according to the above-described process may be kept in shape on the pyramids after the die 52 has been withdrawn and that it may then be impregnated directly on the set of pyramids with a fast-hardening material by any appropriate method, particularly by evaporation of a solvent, so that the resultant structure does not stick to the pyramids 48 of the shaping device.

In the case in which the process is applied to a sufficiently stiff woven material such as a metallic cloth, the product, after the action of the articulated system of bars 50 and shaping may retain definitive shape without requiring the use of any stiffening product.

Figure 15:
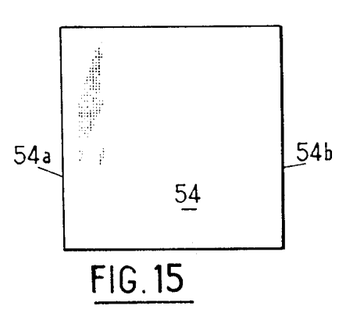
FIG. 15 is a schematic view of a sheet consisting of interwoven threads.

Another method of waffling consists of deforming the stitches in a fabric or wire netting 54 having for example a square shape and consisting of interwoven warp and woof threads extending in the direction shown in FIG. 15.

Figure 16:
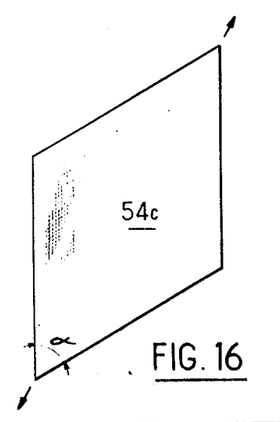
FIG. 16 is a schematic view of the sheet of FIG. 28 after a first deformation along the bias.

By moving the edges 54a and 54b with respect to each other, for example by applying traction in the direction indicated by the arrows in FIG. 16, the originally square stitches become lozenges, the angle α shown on FIG. 16 being for example 60°, and the sheet assumes the shape 54c.

Figure 17:
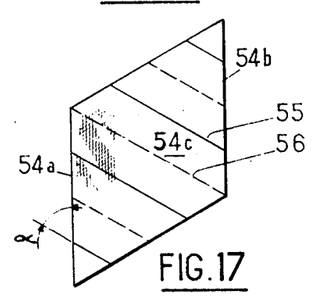
FIG. 17 is a schematic view of the lines along which the sheet in FIG. 16 is folded.
Figure 18:
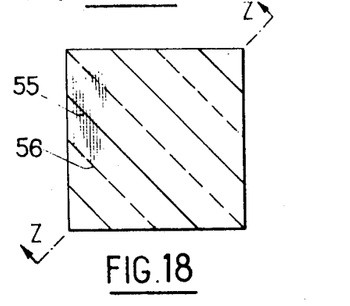
FIG. 18 is a schematic view showing the sheet of FIG. 16 after folding.

A zigzag fold is then made in this sheet 54c along regularly spaced lines which make an angle of 60° with respect to the edges 54a and 54b, the folds shown in FIG. 17 in heavy lines 55 being on top and the folds shown in dashes 56 being underneath. After this folding, the sheet 54c takes, as seen from above, a square shape as shown in FIG. 18.

Figure 19:
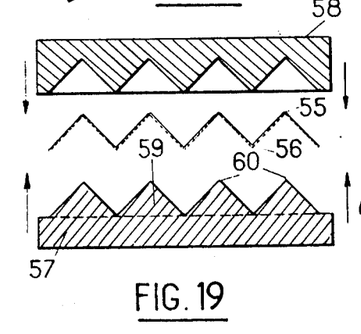
FIG. 19 is an enlarged cross-sectional view of a die and its punch fastened to the sheet of FIG. 18 along Z—Z.

The member 54 is then placed on a male punch 57 as shown in FIG. 19. This punch 57 and the corresponding die 58 comprise complementary diamond points to permit crimping.

The folds 55 being placed on corners 60 of the diamond points 59 and the folds 56 directed toward the bottom falling between the lines of corners 60, when a die 58 is applied, the folds 55 are opened and in their place perpendicular folds form which have edges directed toward the bottom and which comprise, together with the already formed folds 56 and with those which they intersect at 90° angles, the edges of the bases of the pyramids of the end product.

Figure 20:
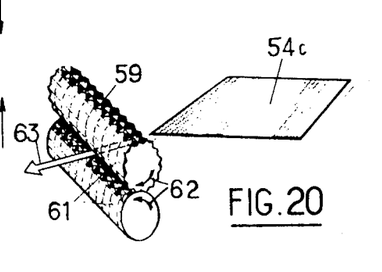
FIG. 20 is a schematic view of rollers designed for waffling the sheet of FIG. 16.

The crimping operation carried out in this way may also be carried out in one pass between rollers 61 comprising male and female diamond points 59, as shown in FIG. 20. The crimped sheet 54c is shown with the bisector of the 60° angle at one of its points perpendicular to the axis of rollers 61. The rollers turn in the direction of arrows 62, while the sheet moves along arrow 63.

With certain materials, it is not necessary for the two rollers 61 to have a diamond pattern. One may be enough, preferably the male, if the other is made of a sufficiently resilient material to assume under pressure the shape of the roller having the projections, so that the sheet being crimped must conform to the diamond pattern.

The sheet may also be passed between rollers 61 without having been previously deformed into a parallelogram, by exerting on sheet 54, which may be of the interwoven type, a holding force to counteract the advancement force acting in the direction of arrow 63. The sheet is consequently deformed along a bias which may be adjusted to suit the desired result.

It goes without saying that in these various methods of shaping members made from sheet material, the initial fold in the direction of the threads may be rectangular, which will lead to pyramids with a rhombic base.

To form a structure according to the invention, it is generally necessary to connect several members, such as those processes of making which have just been described, in accordance with one of the assembly methods first described. Several of these members are shown in FIGS. 2, 4, 5 and 7. The members in question may be flat or cellular, like 8a, 9 or 23.

The structure according to the invention may also be made by expanding a stack of judiciously assembled layers of a deformable material such as cloth or plastic.

The process uses an assembly scheme such that the bonds cause, at the time of the last expansion, the simultaneous deformation of the various layers so that they all take for example the shape of juxtaposed pyramids as in FIGS. 6 or 9 and that once assembled as in FIG. 7, a structure according to the invention is obtained which comprises four sets of intersecting planes.

Expansion with simultaneous stiffening may be obtained by gas or vapor pressure produced inside the stack during the hardening of an impregnating fluid.

Figure 21:
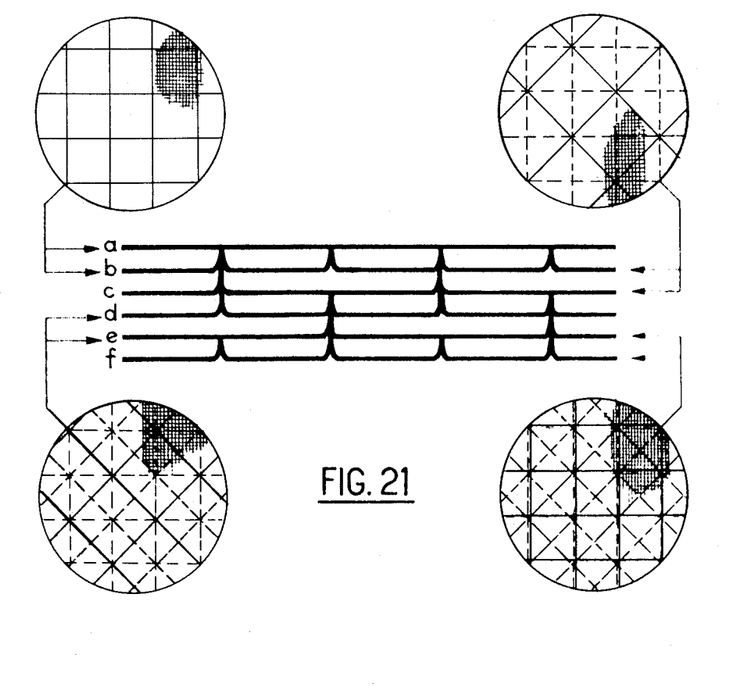
FIG. 21 is a schematic view of the connection of several sheets in one process of manufacturing a structure according to the invention.
Figure 22:
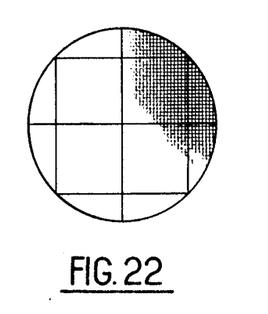
FIG. 22 is a schematic view showing the internal connection of a two-layered sheet along the direction of the threads.
Figure 23:
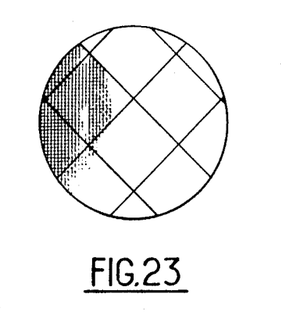
FIG. 23 is a schematic view showing the internal connection of a two-layered sheet along a diagonal with respect to the direction of the threads.

FIG. 21 shows an assembly scheme for different layers of cloth used in the manufacturing process.

When there are two layers of cloth $a$ and $b$, they are interconnected by a network of square stitches in the direction of the warp and woof threads as shown in the upper left-hand portion.

When there is a stack of three layers of cloth $a$, $b$ and $c$, the third layer $c$ is connected to the second layer $b$ by a network of square stitches, but placed on a diagonal with respect to the preceding network and having its intersections coincident with only half of the intersections of the first network, as shown in FIG. 21 in heavy continuous lines on the upper right-hand portion, the connection of the first and second layers being shown in light dashes.

If there is a stack of four layers of cloth $a$, $b$, $c$, and $d$, the third and fourth layers are connected by a network of square stitches exactly superposed under the network connecting the first and second layers as shown in the scheme of FIG. 21 in the upper left-hand portion.

Figure 34:
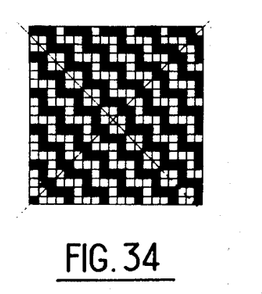
FIG. 34 represents a weave connecting two sheets along their diagonals in the manner of FIG. 33.

If there is a stack of five layers $a$, $b$, $c$, $d$ and $e$, the fifth layer $e$ is connected to the fourth layer $d$ by a network identical to that connecting the second and third layers but shifted with respect to the latter so that the nodes coincide with the nodes of the network between layers $a$ and $b$ or between $c$ and $d$ which are not common to the network corresponding to the connection between $b$ and $c$ as shown in the lower left-hand portion of FIG. 34, this connection being shown in a heavy dashed line.

For a stack of more than five layers of cloth the connections, beginning with the first layer are in the order $a$, $b$, $c$, $d$, $e$, of stacking up to five layers and so on according to the number of layers.

In the arrangement of FIG. 21, the stack has been started by making a connection in the direction of the warp and woof threads, but it could also have begun with diagonal connection like that of layers $b$ and $c$.

This succession of connecting stitches between the various layers may be applied in the same way, but without necessarily relating to a particular direction of the material, to any material made of sheets which can stretch simultaneously in several directions as for example plastic or ductile metals.

With respect to the connections between the layers of the stack, they may be formed in any appropriate manner according to the nature of the layers, the means used being generally gluing, sewing, soldering or a direct connection at the instant of weaving as will be shown later in the description of processes of manufacturing multilayered cloths designed for this purpose.

Indeed, the connection between several layers of cloth may be obtained directly during weaving by the simultaneous production on a single power loom of several layers of cloth interconnected as described in FIG. 21.

The connection between the layers during simultaneous weaving may be achieved in various ways:

For a three-layered tissue, two are connected with a square stitch in the direction of the threads and the third layer is connected to the middle layer by square stitches which lie on a diagonal as in the arrangement of FIG. 21 in the upper right-hand portion.

These connections may be made in various ways using the techniques commonly used on power looms.

To illustrate the variety of possibilities, several embodiments of connections between two layers will now be described.

In a first embodiment shown in FIGS. 24, 25 and 26, the connection between two simultaneously woven layers is made along a line parallel to the woof by an extra woof thread passing alternately above each warp thread of the upper layer, and below each warp thread of the lower layer. A connection along a line parallel to the warp is made in the same way by an extra warp thread passing alternately above each woof thread of the upper layer and below each woof thread of the lower layer.

Figure 26:
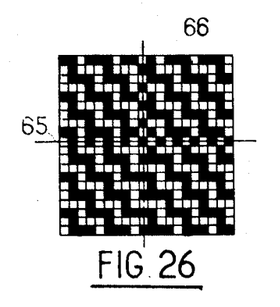
FIG. 26 shows a weave conforming to FIGS. 24 and 25.

FIG. 26, like the subsequent figures 28, 32, 34 and 35, shows a weave used in the textile industry.

Figure 24:
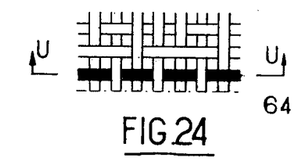
FIG. 24 shows one method of linking a two-layered sheet with threads.
Figure 25:
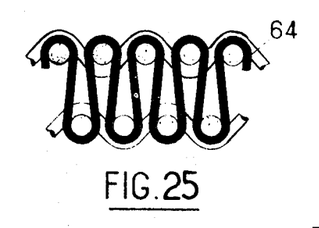
FIG. 25 is a large-scale view along the line U—U of FIG. 24.

FIG. 26 shows a cloth with two layers interconnected along a line parallel to the woof by the thread 65 corresponding to thread 64 of FIGS. 24 and 25 and also along a line parallel to the warp by the warp thread 66.

Figure 27:
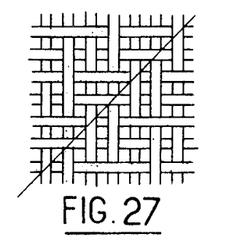
FIG. 27 shows one method for connecting two sheets along a diagonal line by interweaving of the warp and woof threads.
Figure 28:
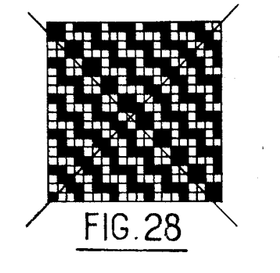
FIG. 28 shows a weave conforming to FIG. 27.
Figure 29:
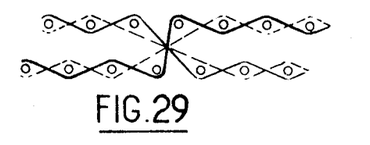
FIG. 29 is a schematic view showing a cross section of the connection of two sheets by complete interstitching of the threads.

In a second embodiment shown in FIGS. 27 and 28, the connection between two layers woven simultaneously is by interweaving the warp or woof threads of one of the layers with the warp or woof threads of the other layer, and vice versa, along the lines along which the connection is made.

By way of example, when the connection is oblique the interweaving may be carried out along diagonal lines as represented in FIG. 27. In the figure the layer is shown in grey and the lower layer in white. The two normally independent layers are connected along the oblique line by a process like that just described. FIG. 28 shows the intersection of two connecting lines of this type.

In a third embodiment of the connection between two layers of simultaneously woven cloth, which represents the preferred embodiment of the invention, the connection between the two layers really corresponds to a true crossing of these layers, with the one which is on top on one side of the intersection being on the bottom on the other side of this intersection and vice versa.

Figure 30:
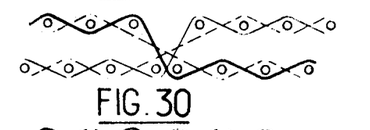
FIG. 30 is a variation of FIG. 29.
Figure 31:
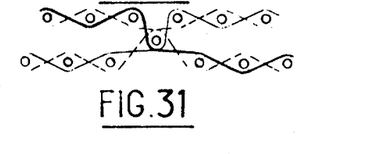
FIG. 31 is another variation of FIG. 29.
Figure 32:
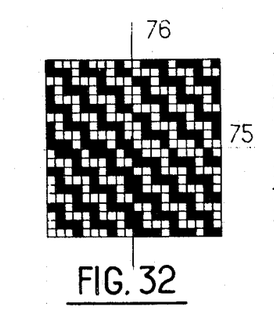
FIG. 32 shows a weave connecting the layers of a two-layered fabric along lines parallel to its warp and woof as in the case of FIG. 30.
Figure 33:
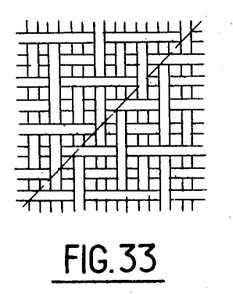
FIG. 33 shows a detail of the connection of the two sheets by complete interweaving along a diagonal line.

FIGS. 30 and 34 show variations of this embodiment for assemblies along lines parallel to the threads (FIGS. 29, 30, 31, 32) or on a diagonal (FIGS. 33, 34). It can be seen on FIG. 33 that, for the portion above the diagonal the grey threads corresponding to one layer are above the white threads corresponding to the other layer.

In the portion below the diagonal, these grey threads are beneath the white threads.

By using the various connecting methods described above, either with supplementary threads, or by interweaving the threads along any lines, or by crossing these layers, multilayered members can be produced whose layers are interconnected by square stitches running either in the direction of the threads or on a bias no matter how many layers there are.

Figure 35:
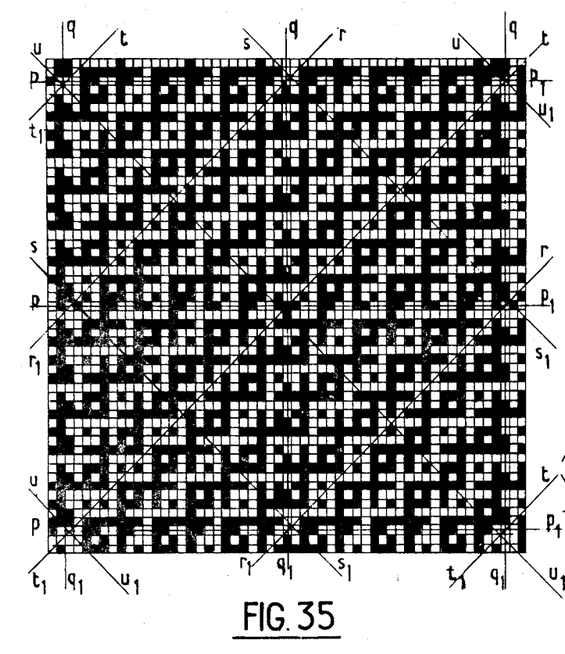
FIG. 35 shows a weave connecting four layers partly by independent threads as in the case of FIG. 26 and partly by complete interweaving as in FIG. 34.

FIG. 35, given by way of example, shows a fabric having four layers, the first being on the bottom. The diagonal lines $u-u_1$ and $t-t_1$ represent connections between the first and second layers by complete interweaving of the threads in accordance with the arrangement of FIG. 34, the diagonal lines $s-s_1$ and $r-r_1$ represent connections between the third and fourth layers also by interweaving of the threads according to the same pattern, while the lines in the direction of threads $q-q_1$ and $p-p_1$ represent connections between the second and third layers by supplementary threads according to the arrangement of FIG. 26.

The connections between the various layers of multilayered fabric having been brought about by one or more of the processes such as those just described, these fabrics may be used to produce structures according to the invention by expanding them as hereinafter shown.

If a structure of great thickness is desired, several thicknesses of multilayered fabric are assembled in any of the foregoing manners, whole taking care to alternate connections along the bias with those in the direction of the threads and to preserve their relative spacing.

Figure 36:
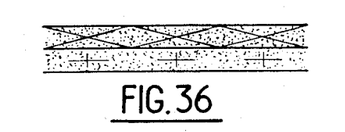
FIG. 36 is a schematic cross section of a three-layered weave.
Figure 37:
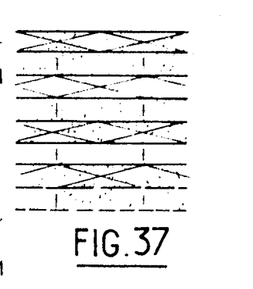
FIG. 37 is a schematic cross section of an assembly comprising several three-layered components.

FIGS. 36 and 37 show by way of example connections between different layers of multilayered fabric.

FIG. 36 shows schematically a three-layered fabric with diagonal connections between the first and second layers and connections in the direction of the threads between the second and third layers.

To make the fabric shown in FIG. 37, three-layered fabrics shown in grey have been assembled alternately right side up and upside down and the connections are made alternately on a bias and in the direction of the threads.

In one preferred form of the invention, a four-layered fabric having two connections on a bias and one connection in the direction of the threads is assembled with another identical fabric only by connections in the direction of the threads.

The different layers connected according to the previously described schemes, may be impregnated either before or after interconnection with a liquid material which will harden while giving off a gas or vapor.

The stack of layers which are interconnected and have been impregnated with the chosen material is exposed to outside conditions causing both expansion and stiffening following the internal release of the gas or vapor; for example, it may be placed in an oven or be subjected to a vacuum either while cold or while being heated.

The release of the gas tends to make the structure expand by separating the layers where they are not connected since the binder with which the fabric is impregnated blocks the holes formed by the intersection of the threads preventing the gas from being released to the outside.

It should be noted that the surface of an outer layer connected to the subjacent layer along the bias will, after expansion take on the aspect of juxtaposed points, these points being generally rounded. On the other hand if it is connected to the subjacent layer in the direction of the threads it will after expansion show a grid of similarly rounded edges.

The structure according to the invention may also be produced by expanding a stack of layers of any material which can be stretched in several directions simultaneously such as plastic materials or ductile metals. Use of these materials makes it possible to obtain the structures previously described for fabrics as well as other structures according to the invention.

The expansion may be carried out have made the connections by soldering, glueing or any other appropriate means along suitable lines with any appropriate substance which can give off a gas or vapor, said products being placed in the cells at the time of the assembling of the layers.

Another method for producing the expansion without using a product to release gas consists of pulling mechanically on the opposite faces of an assembly of flat members.

Figure 38:
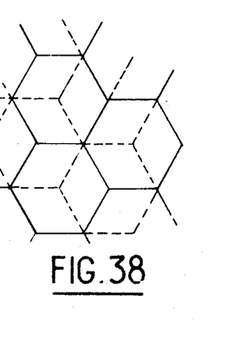
FIG. 38 is a schematic view of the connections between the layers of deformable material from which a structure comprising three sets of flat sheets according to the invention may be produced by expansion.

A structure of this type results from the expansion of layers of deformable material interconnected by networks of lines forming a juxtaposed hexagons as shown in FIG. 38, the heavy lines corresponding to the connections between any layer and the one beneath, while the dashes correspond to connections between this same layer and the one above it.

After expansion, a structure embodying the intersection of three sets of continuous sheets delimiting cells in the shape of cubes or parallelepipeds like that shown in FIG. 2 is formed.

Another structure of this type results from the expansion of an assembly of two layers of deformable material between two layers of material which are not to be deformed, the connections being like those shown in FIG. 21.

After expansion, a structure having five sets of sheets, one of the sets consisting of the two undeformed outer layers, is formed.

The structure made according to the various processes herein described has a particular interest in the manufacture of sandwich materials which must be highly resistant to crushing, shearing stresses and flexing.

It should be mentioned that, the version of this structure produced by expansion makes it possible to provide in a very compact form flexible preimpregnated members which, when they are exposed to interplanetary space, expand and stiffen irreversibly and consequently maintain their properties in spite of perforations by any meteorites which they may encounter.

Without departing from the basic principles of the invention, the shape of the structure may be change by applying to it, for example during expansions, stresses imparting thereto curves in desired directions or by limiting the space in which it expands.

The different processes for manufacturing the structure according to the invention which have just been described first lead either to the production of members which may then be assembled or to the production of assemblies of sheets which may then be expanded.

In the first case, the members are so assembled that the faces of their cells are so aligned with each other as to form sets of parallel, continuous planes, with the members touching each other at the edges, and so that the cells thus formed are closed except at the edges of the structure. The resistance of the assembly may be increased by flattening the edges while retaining the characteristics of the structure according to the invention. The connection between the members is made in any manner appropriate to the nature of the material used, this connection being made particularly by soldering, gluing, sewing or hooking.

In the second kind of process, the sheets made of deformable material are so assembled that after expansion and the resultant deformations the sheets have the shape and the type of assembly of the crimped members used in the first kind of process.

It will of course be appreciated that the embodiments of this invention which have been described have been given purely by way of invention and may be modified as to detail without thereby departing from the basic principles of the invention.

What is claimed is:

1. The method of making a three-dimensional structure which comprises the steps of forming a stack of deformable substantially parallel sheets comprising a hardenable material with each of said sheets connected to each adjacent sheet along intersecting sets of parallel lines on adjacent surfaces thereof, which lines define a network of identical polygons, expanding said stack in a direction perpendicular to the surfaces of said sheets into a cellular structure consisting of a plurality of regular polyhedrons, the walls of which define at least three intersecting sets of continuous parallel planes extending from one of the two outer surfaces of the structure which were forced apart by said expansion to the other, and hardening said sheets after said expansion so that the completed structure is supported by said walls in its expanded state.

2. The method claimed in claim 1 according to which said stack of sheets is mechanically expanded in a direction perpendicular to the plane of said sheets after said sheets have been connected together.

3. The method claimed in claim 1 in which said identical polygons are rectangles.

4. The method claimed in claim 1 in which said identical polygons are parallelograms.

5. The method claimed in claim 1 in which said walls comprise a heat-hardenable material and said structure is heated when expanded to form a rigid structure.

6. The method claimed in claim 1 in which said stack of sheets is formed by interweaving webs of cloth so that when one polygonal section of any given web is uppermost, an adjacent section of the given web lies beneath another web, a section of said given web contiguous to said adjacent section lies beneath two other webs, and so on until a section of said given web lies on the bottom of the stack, and said webs form the walls of said regular polyhedrons when said stack is expanded.

7. The method claimed in claim 1 in which said sheets are impregnated with a substance which generates gas when treated, and said treatment is applied to said stack of connected sheets.

8. The method claimed in claim 1 in which said stack also comprises sheets which are undeformable by the expanding force applied during the process, but at least one of each pair of adjacent sheets is deformable.

9. The method claimed in claim 1 in which said at least three sets of planes have no common generatrix.

10. The method claimed in claim 1 according to which there are at least three sheets in the stack and in which each sheet intermediate the uppermost and lowermost sheets is connected to one of the adjacent sheets along a network of lines which are positioned diagonally with respect to the lines along which said intermediate sheet is connected to the other adjacent sheet.

11. The method claimed in claim 10 in which each of the two networks of lines connecting an intermediate sheet to the adjacent sheets defines a plurality of intersections, and the intersections in each network register with those of the other network, but the lines of one said two networks run at an angle to the lines of the other of said two networks.

* * * * *